(12) United States Patent
De Coninck et al.

(10) Patent No.: US 7,941,405 B2
(45) Date of Patent: May 10, 2011

(54) PASSWORD PROTECTION FOR FILE BACKUPS

(75) Inventors: Tom De Coninck, Gent (BE); Hans Pype, Nazareth (BE)

(73) Assignee: Data Center Technologies, Mountain View, CA (US)

( * ) Notice: Subject to any disclaimer, the term of this patent is extended or adjusted under 35 U.S.C. 154(b) by 248 days.

(21) Appl. No.: 11/731,113

(22) Filed: Mar. 30, 2007

(65) Prior Publication Data

US 2008/0244732 A1     Oct. 2, 2008

(51) Int. Cl.
*G06F 17/30* (2006.01)

(52) U.S. Cl. ............................ 707/652; 726/28; 707/821

(58) Field of Classification Search .................. 707/204, 707/652, 821, 999.204; 726/28
See application file for complete search history.

(56) References Cited

U.S. PATENT DOCUMENTS

| | | | | |
|---|---|---|---|---|
| 5,649,196 A * | 7/1997 | Woodhill et al. ........................ 1/1 |
| 5,778,395 A * | 7/1998 | Whiting et al. ......................... 1/1 |
| 6,260,069 B1 * | 7/2001 | Anglin ............................ 709/229 |
| 6,535,976 B1 * | 3/2003 | Hoggarth et al. ................... 713/2 |
| 6,549,912 B1 * | 4/2003 | Chen ........................... 707/104.1 |
| 6,574,733 B1 | 6/2003 | Langford |
| 6,615,225 B1 * | 9/2003 | Cannon et al. ......................... 1/1 |
| 6,738,903 B1 * | 5/2004 | Haines ........................... 713/168 |
| 7,062,541 B1 * | 6/2006 | Cannon et al. ................. 709/219 |
| 7,213,158 B2 * | 5/2007 | Bantz et al. .................... 713/193 |
| 7,222,233 B1 | 5/2007 | Rubin |
| 7,240,079 B2 * | 7/2007 | Markkanen .................... 707/204 |
| 7,634,627 B1 * | 12/2009 | Ohr et al. ....................... 711/162 |
| 2002/0107877 A1 * | 8/2002 | Whiting et al. ................ 707/204 |
| 2002/0152231 A1 * | 10/2002 | Silva-Craig et al. ........... 707/204 |
| 2002/0156965 A1 * | 10/2002 | Gusler et al. .................... 711/100 |
| 2003/0005244 A1 * | 1/2003 | Markkanen .................... 711/162 |
| 2003/0028592 A1 * | 2/2003 | Ooho et al. ...................... 709/203 |
| 2003/0050940 A1 * | 3/2003 | Robinson ....................... 707/204 |
| 2004/0044707 A1 * | 3/2004 | Richard ......................... 707/204 |
| 2004/0049700 A1 * | 3/2004 | Yoshida ......................... 713/201 |
| 2004/0054866 A1 * | 3/2004 | Blumenau et al. ............. 711/202 |
| 2004/0064693 A1 * | 4/2004 | Pabla et al. ..................... 713/168 |
| 2004/0098426 A1 * | 5/2004 | Ishii et al. ...................... 707/204 |
| 2004/0098609 A1 * | 5/2004 | Bracewell et al. ............. 713/200 |
| 2004/0109063 A1 * | 6/2004 | Kusaka et al. ............. 348/207.1 |

(Continued)

OTHER PUBLICATIONS

Wispelaere, "Secure Optimized Data Protection for Remote Offices: An Overview of Veritas NetBackup PureDisk Remote Office Edition", Symantec, Feb. 2006, pp. 1-20, submitted by Applicant on Jul. 16, 2009.*

(Continued)

*Primary Examiner* — Hung T Vy
*Assistant Examiner* — Phuong-Thao Cao
(74) *Attorney, Agent, or Firm* — Rory D. Rankin; Meyertons, Hood, Kivlin, Kowert & Goetzel, P.C.

(57) ABSTRACT

Various embodiments of a system and method for performing file backup operations are described. The method may operate to enable a user of a computer system to provide a password or other authentication information to associate with files on the computer system, e.g., in order to protect files that are backed up. For example, when the user (or another person or software agent) attempts to restore or otherwise access a backup copy of a password-protected file, the user may be prompted to enter the password. The method may operate to verify that the entered password matches the password associated with the file before granting permission to restore the file.

19 Claims, 7 Drawing Sheets

Client computer 102A                              Backup server 100

U.S. PATENT DOCUMENTS

| | | | |
|---|---|---|---|
| 2004/0117636 A1* | 6/2004 | Cheng | 713/185 |
| 2004/0260973 A1* | 12/2004 | Michelman | 714/13 |
| 2005/0010609 A1* | 1/2005 | Katoh et al. | 707/200 |
| 2005/0038836 A1* | 2/2005 | Wang | 707/204 |
| 2005/0108486 A1* | 5/2005 | Sandorfi | 711/162 |
| 2006/0043164 A1* | 3/2006 | Dowling et al. | 235/375 |
| 2006/0075228 A1* | 4/2006 | Black et al. | 713/167 |
| 2006/0095779 A9* | 5/2006 | Bhat et al. | 713/182 |
| 2006/0110012 A1* | 5/2006 | Ritter | 382/115 |
| 2006/0155788 A1* | 7/2006 | Peterson et al. | 707/204 |
| 2006/0178053 A1* | 8/2006 | Inaba | 439/630 |
| 2006/0230081 A1* | 10/2006 | Craswell et al. | 707/204 |
| 2006/0288424 A1* | 12/2006 | Saito | 726/26 |
| 2007/0112896 A1* | 5/2007 | Sandorfi et al. | 707/204 |
| 2007/0136593 A1* | 6/2007 | Plavcan et al. | 713/172 |
| 2007/0168656 A1* | 7/2007 | Paganetti et al. | 713/155 |
| 2007/0180207 A1* | 8/2007 | Garfinkle | 711/162 |
| 2007/0203957 A1* | 8/2007 | Desai et al. | 707/204 |
| 2007/0220319 A1* | 9/2007 | Desai et al. | 714/13 |
| 2008/0005334 A1* | 1/2008 | Utard et al. | 709/226 |
| 2008/0060085 A1* | 3/2008 | Samzelius et al. | 726/30 |
| 2008/0126445 A1* | 5/2008 | Michelman | 707/204 |
| 2008/0130890 A1* | 6/2008 | Rigler | 380/259 |
| 2008/0147821 A1* | 6/2008 | Dietrich et al. | 709/216 |
| 2008/0148370 A1* | 6/2008 | Allwright | 726/5 |
| 2008/0154989 A1* | 6/2008 | Arman | 707/204 |
| 2008/0215667 A1* | 9/2008 | Rothbarth et al. | 709/202 |

OTHER PUBLICATIONS

Bella et al., "Distributed Backup through Information Dispersal", Electronic Notes in Theoretical Computer Science 142, 2006, pp. 63-77, accessed online at <http://www.sciencedirect.com on Nov. 17, 2009.*

Barr et al., "pStore: A Secure Distributed Backup System", 2001, pp. 1-8, accessed online at <http://kbarrnet/static/pstore/progress.pdf> on Nov. 17, 2009.*

* cited by examiner

PASSWORD PROTECTION FOR FILE BACKUPS

BACKGROUND OF THE INVENTION

1. Field of the Invention

This invention relates generally to file backup software for backing up files in a computer system.

2. Description of the Related Art

Computer systems generally store information as files organized by a file system. Each file may be stored on a storage device, such as a disk drive, optical drive, or tape drive. It is often necessary to back up files in a file system, e.g., by copying them to another storage device. For example, backup operations may be performed to guard against data loss, to provide a snapshot of files at a particular point in time, or to replicate files for other purposes.

A computer system typically executes backup software to back up files. The backup software may provide a user interface enabling the user or an administrator to configure various options for file backup operations, such as when or how often to perform the backup, which files to back up, where to back up the files, etc.

SUMMARY

Various embodiments of a system and method for performing file backup operations are described herein. According to one embodiment of the method, a file to be backed up may be received. The received file may be backed up, e.g., by storing the data in the file on one or more storage devices. The method may further comprise receiving first authentication information, such as a password, biometric information, or other useable to subsequently verify that a person or software agent attempting to access the backed up file is properly authorized to do so. The method may operate to store information indicating that the first authentication information is required to restore the backed-up file.

According to a further embodiment of the method, a request to restore the backed-up file may be received, e.g., after the file has been backed up. The method may further comprise receiving second authentication information and determining whether the second authentication information matches the first authentication information. If the second authentication information matches the first authentication information then permission to restore the backed-up file may be granted. Otherwise, permission to restore the backed-up file may be denied.

BRIEF DESCRIPTION OF THE DRAWINGS

A better understanding of the invention can be obtained when the following detailed description is considered in conjunction with the following drawings, in which.

While the invention is susceptible to various modifications and alternative forms, specific embodiments thereof are shown by way of example in the drawings and are described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION

Various embodiments of a system and method for performing file backup operations are described herein. The method may operate to enable a user of a computer system to provide a password or other authentication information to associate with files on the computer system, e.g., in order to protect files that are backed up. For example, when the user (or another person or software agent) attempts to restore or otherwise access a backup copy of a password-protected file, the user may be prompted to enter the password. The method may operate to verify that the entered password matches the password associated with the file before granting permission to restore the file.

Figure 1:
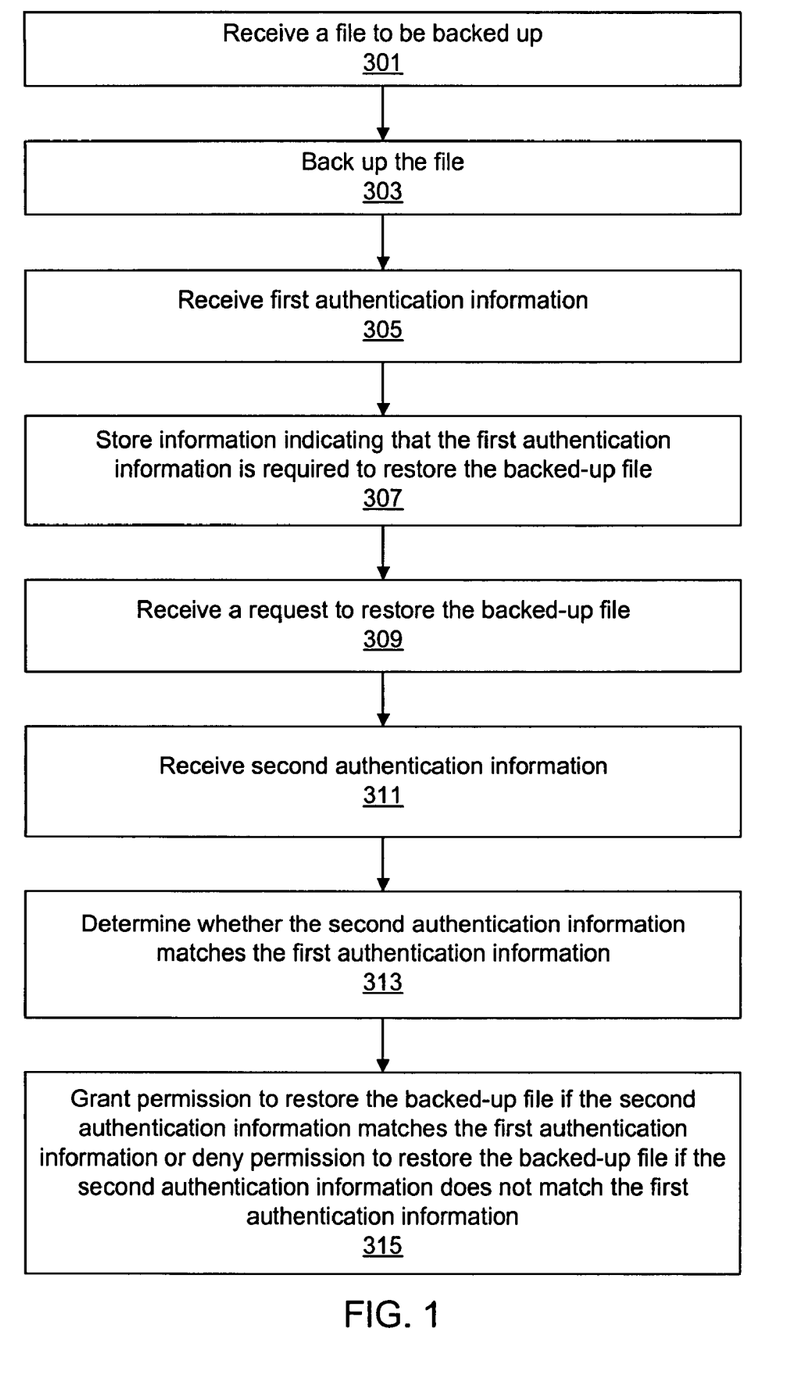
FIG. 1 is a flowchart diagram illustrating one embodiment of a method for performing file backup operations, where passwords or other authentication information are used to protect files that are backed up.

FIG. 1 is a flowchart diagram illustrating one embodiment of the method. The method may be performed by backup management software executing on one or more computer systems.

In 301, the backup management software may receive a file to be backed up. For example, the file may be received during a backup operation either separately or together with one or more other files. In some embodiments the backup management software may execute on the same computer system as the computer on which the file to be backed up is originally stored. In other embodiments the backup management software may execute on a different computer system than the computer on which the file to be backed up is originally stored and may, for example, receive the file via a network.

In 303, the backup management software may back up the file. Backing up the file may comprise storing the data in the file, e.g., storing the data on one or more different storage devices than the storage device on which the file is originally stored. For example, one or more backup copies of the file may be created on one or more different storage devices.

In 305, first authentication information may be received. The first authentication information may be used to protect access to the backup copy of the file. The first authentication information may comprise any kind of information useable to verify that a person or software agent attempting to access the backup copy of the file is properly authorized to do so. For example, in some embodiments the first authentication information may comprise a password. In other embodiments the first authentication information may comprise biometric information, such as a fingerprint, voice information, retinal scan, etc. For example, the password or biometric information may be provided by a user of the computer system on which the file is originally stored.

In 307, the backup management software may store information indicating that the first authentication information is required to restore the backed-up file. For example, the backup management software may store information in a database or a data structure associated with the file in order to indicate that a person or software agent attempting to restore the backed-up file is required to provide the first authentication information.

The backup management software may also store the first authentication information itself or may store information derived from the first authentication information. For example, where the first authentication information comprises a password, the backup management software may store the password (possibly in an encrypted form). As another example, the backup management software may apply a hashing function or other algorithm to the password and store the results of the hashing function.

In 309, a request to restore the backed-up file may be received, e.g., a request to retrieve the file data stored in 303 and re-create the file or create a new version of the file based on the data. For example, the request may be received when a restore operation is initiated at some time subsequently to when the file was backed up. For example, in some embodiments a user may interact with a graphical user interface (GUI) of the backup management software in order to request to restore the backed-up file. In other embodiments a user may interact with another client application to request to restore the backed-up file, and the client application may then communicate with the backup management software to request to restore the backed-up file.

In 311, the backup management software may receive second authentication information. In some embodiments the second authentication information may be received as part of the request to restore the backed-up file. In other embodiments the backup management software may prompt for the second authentication information in response to the request to restore the backed-up file, and the second authentication information may then be separately provided to the backup management software. For example, in response to the request to restore the backed-up file, the backup management software may determine that the first authentication information is required to restore the backed-up file, based on the information stored in 307. Thus, the backup management software may prompt for the second authentication information, which is then used to authorize access to the backed-up file, e.g., as described below.

In 313, the backup management software may determine whether the second authentication information matches the first authentication information. In various embodiments any kind of algorithm or technique may be used to determine whether the second authentication information matches the first authentication information, e.g., depending on the type of authentication information. For example, where the first authentication information comprises a first password and the second authentication information comprises a second password, the backup management software may determine whether the second password is the same as the first password. As another example, where the first authentication information comprises a first fingerprint and the second authentication information comprises a second fingerprint, the backup management software may perform an analysis algorithm to determine whether the second fingerprint is the same as the first fingerprint.

As indicated in 315, the backup management software may grant permission to restore the backed-up file if the second authentication information matches the first authentication information or may deny permission to restore the backed-up file if the second authentication information does not match the first authentication information. For example, if the second authentication information matches the first authentication information then the backup management software may proceed to restore the backed-up file, e.g., by creating a copy of the backed-up file on the storage device or computer system from which the file was originally backed up, or on another requested storage device or computer system.

If, on the other hand, the second authentication information does not match the first authentication information then the backup management software may, for example, return a response to the request received in 309 indicating that the second authentication information did not match and/or cause information indicating that the second authentication information did not match to be displayed.

It is noted that in various embodiments, the steps shown in FIG. 1 may be combined, omitted, or performed in different orders. For example, the first authentication information may be received at various times in relation to the time at which the file is backed up. For example, in some embodiments the first authentication information may be received at the time of backup. For example, when the backup of the file is initiated the user of the computer system on which the file is originally stored may specify the first authentication information.

In other embodiments the first authentication information may be received before the time of backup. For example, the user of the computer system on which the file is originally stored may specify a password or other authentication information to be used to protect files that are backed up in future backup operations.

In other embodiments the first authentication information may be received after the time of backup. For example, the user of the computer system on which the file is originally stored may specify a password or other authentication information to be associated with a file that has already been backed up.

It is also noted that the method of FIG. 1 may be used to protect a backed up file from additional types of access other than just restore operations. For example, in some embodiments the backup management software may be operable to display a graphical user interface enabling a user to view the contents of files that have been backed up, without necessarily restoring the files. If a password or other authentication information has been associated with a file then the backup management software may require the user to input the authentication information before being allowed to view the contents of a backed up file.

Figure 2:
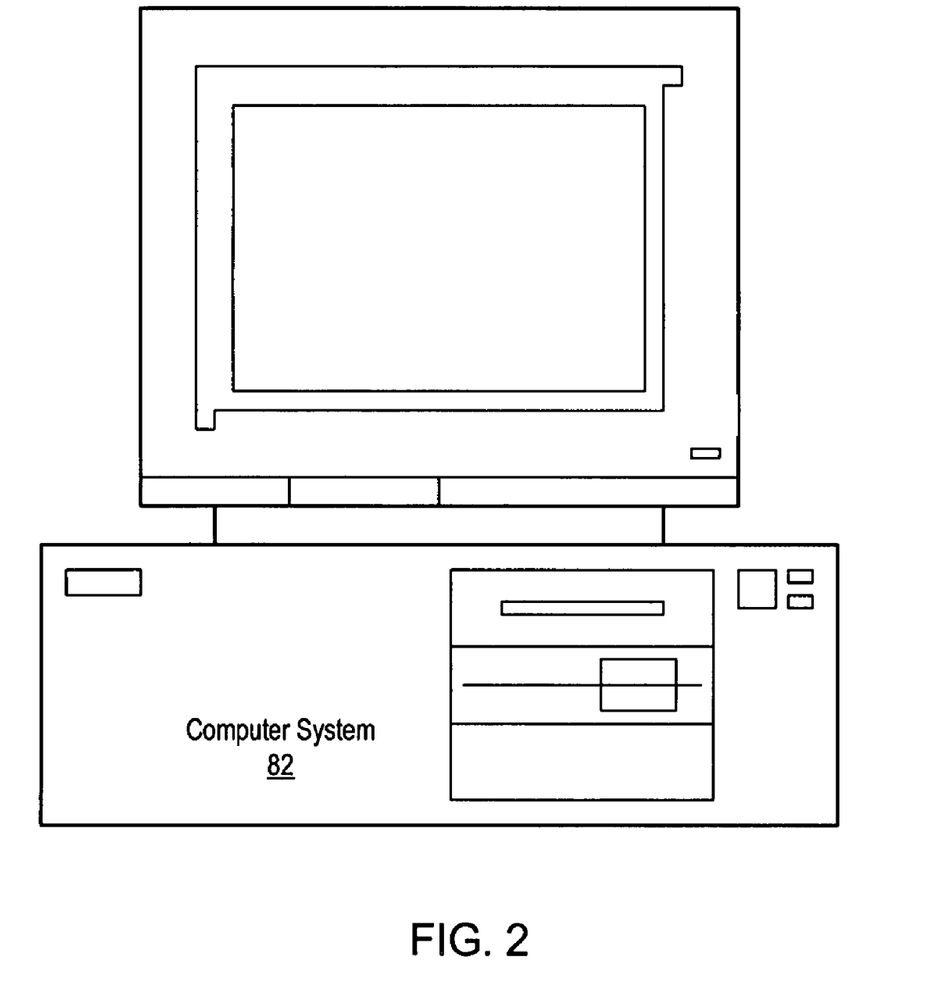
FIG. 2 illustrates one embodiment of a standalone computer system operable to implement one embodiment of the method of FIG. 1.

In various embodiments the method of FIG. 1 may operate on any type of computer system or in any kind of computing environment. For example, in some embodiments the method may be used in the context of a single computer system, such as the computer system 82 illustrated in FIG. 2. The computer system 82 may execute backup management software operable to backup files stored on a hard drive or other storage device of the computer system 82, e.g., by creating backup copies on another storage device, where the backup copies are protected with a password or other authentication information.

Figure 3:
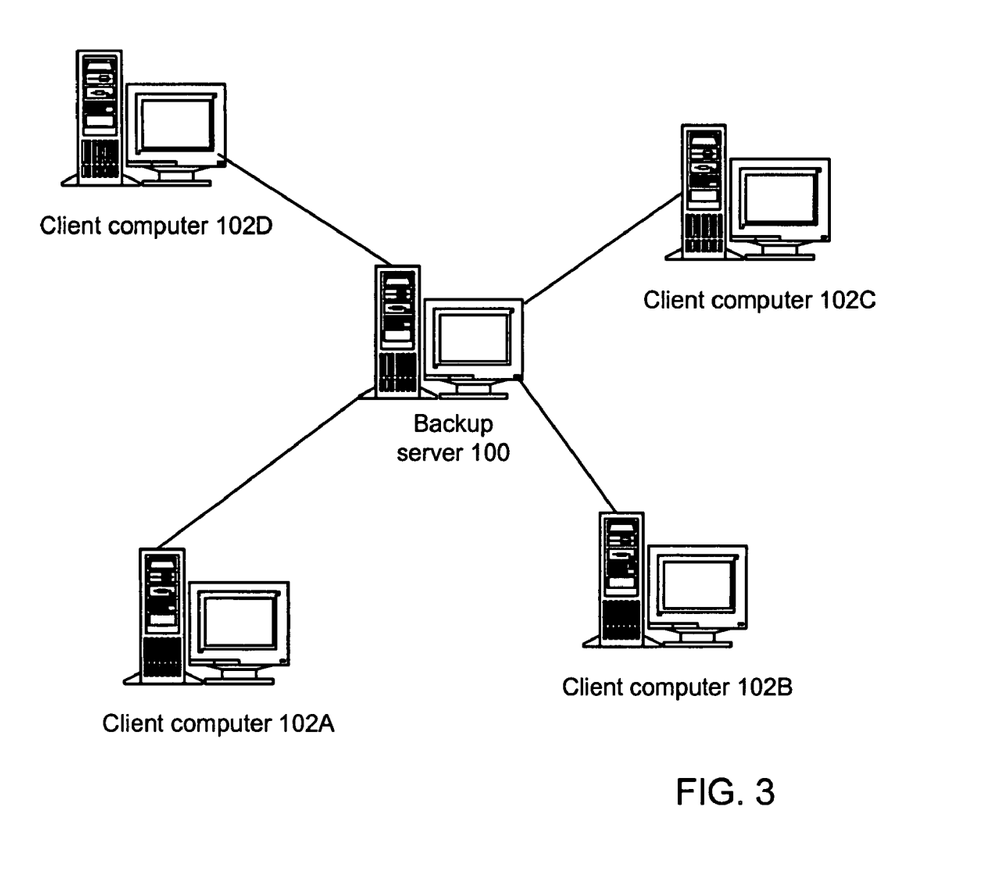
FIG. 3 illustrates one embodiment of a system in which another embodiment of the method of FIG. 1 is implemented.

In other embodiments the method of FIG. 1 may be used in a networked computing environment. For example, FIG. 3 illustrates an example in which a plurality of client computers 102 are coupled to a backup server computer 100. Each client computer 102 may store a plurality of files. The backup server computer 100 may execute backup management software operable to communicate with each client computer 102 in order to back up the files of the client computer 102 to the backup server 100.

Figure 4:
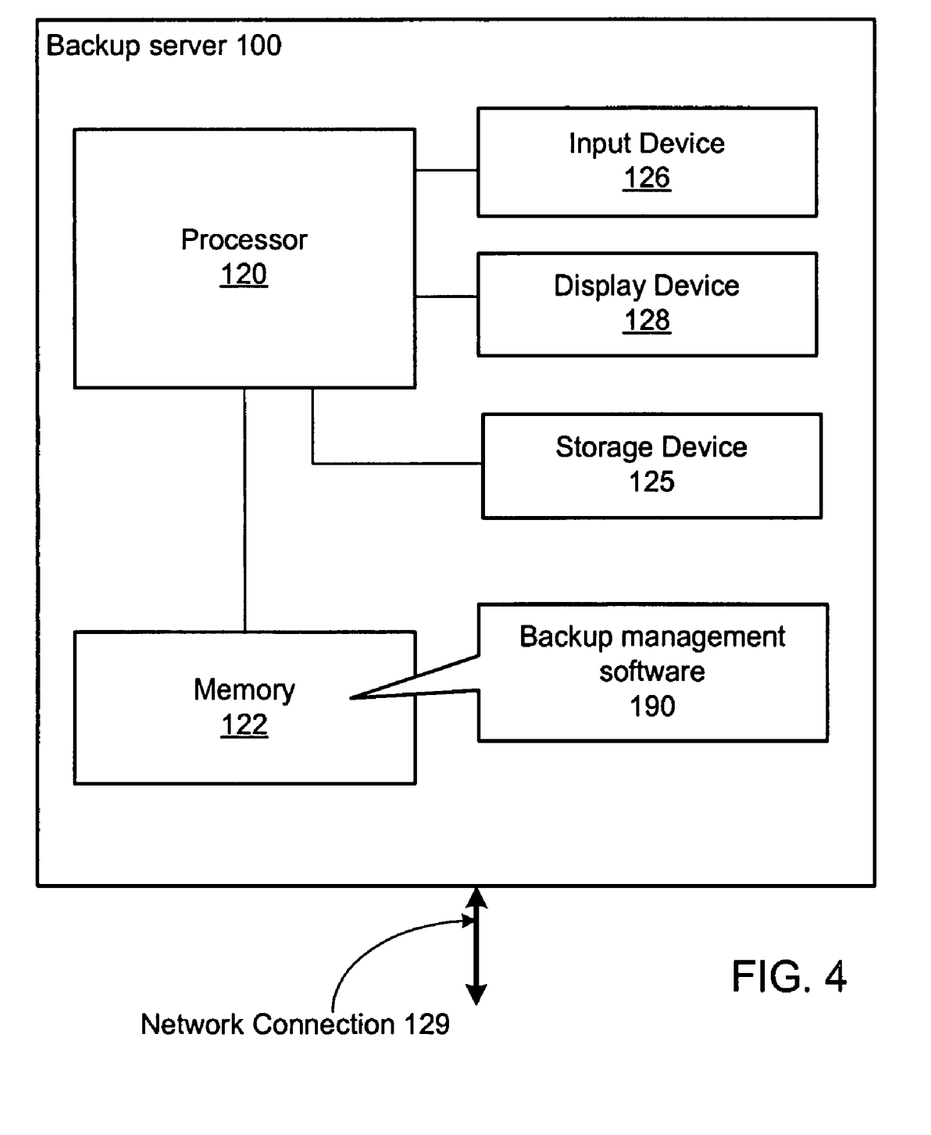
FIG. 4 illustrates an example of a backup server computer such as illustrated in the system of FIG. 3.

FIG. 4 illustrates an example of a backup server computer 100 according to one embodiment. The backup server computer 100 includes a processor 120 coupled to a memory 122. In some embodiments, the memory 122 may include one or more forms of random access memory (RAM) such as dynamic RAM (DRAM) or synchronous DRAM (SDRAM). However, in other embodiments, the memory 122 may include any other type of memory instead or in addition.

The memory 122 may be configured to store program instructions and/or data. In particular, the memory 122 may store backup management software 190, which may be executed by the processor 120. The backup management software 190 may be operable to perform various aspects of the file backup method described herein, e.g., operations such as described above with reference to FIG. 1. As described below, each client computer 102 may execute backup client software 180 with which the backup management software 190 on the backup server computer 100 communicates in performing the file backup method.

In some embodiments the backup management software 190 may also enable an administrator to perform various administration tasks related to file backup operations in the system. For example, the backup management software 190 may be operable to display a graphical user interface enabling the administrator to configure times or conditions specifying when backup operations on the various client computers 102 in the system should be performed.

It is noted that the processor 120 is representative of any type of processor. For example, in one embodiment, the processor 120 may be compatible with the x86 architecture, while in another embodiment the processor 120 may be compatible with the SPARC™ family of processors. Also, in one embodiment the backup server computer 100 may include multiple processors 120.

The backup server computer 100 also includes or is coupled to one or more storage devices 125. Files that are backed up from the client computers 102 to the backup server computer 100 may be stored on the storage device(s) 125. In various embodiments the storage devices 125 may include any of various kinds of storage devices operable to store data, such as optical storage devices, hard drives, tape drives, etc. As one example, the storage devices 125 may be implemented as one or more hard disks configured independently or as a disk storage system. As another example, the storage devices 125 may be implemented as one or more tape drives. In some embodiments the storage devices 125 may operate in a storage system or library device with which the backup server computer 100 communicates via a communication bus or network.

The backup server computer 100 may also include one or more input devices 126 for receiving user input from a user of the backup server computer 100. The input device(s) 126 may include any of various types of input devices, such as keyboards, keypads, microphones, or pointing devices (e.g., a mouse or trackball). The backup server computer 100 may also include one or more output devices 128 for displaying output to the user. The output device(s) 128 may include any of various types of output devices, such as LCD screens or monitors, CRT monitors, etc.

The backup server computer 100 may also include a network connection 129 through which the backup server computer 100 couples to the client computers 102. The network connection 129 may include any type of hardware for coupling the backup server computer 100 to a network, e.g., depending on the type of network. In various embodiments, the backup server computer 100 may be coupled to the client computers 102 via any type of network or combination of networks. For example, the network may include any type or combination of local area network (LAN), a wide area network (WAN), an Intranet, the Internet, etc. Exemplary local area networks include Ethernet networks, Fiber Distributed Data Interface (FDDI) networks, and token ring networks. Also, each computer may be coupled to the network using any type of wired or wireless connection medium. For example, wired mediums may include Ethernet, fiber channel, a modem connected to plain old telephone service (POTS), etc. Wireless connection mediums may include a satellite link, a modem link through a cellular service, a wireless link such as Wi-Fi™, a wireless connection using a wireless communication protocol such as IEEE 802.11 (wireless Ethernet), Bluetooth, etc.

Figure 5:
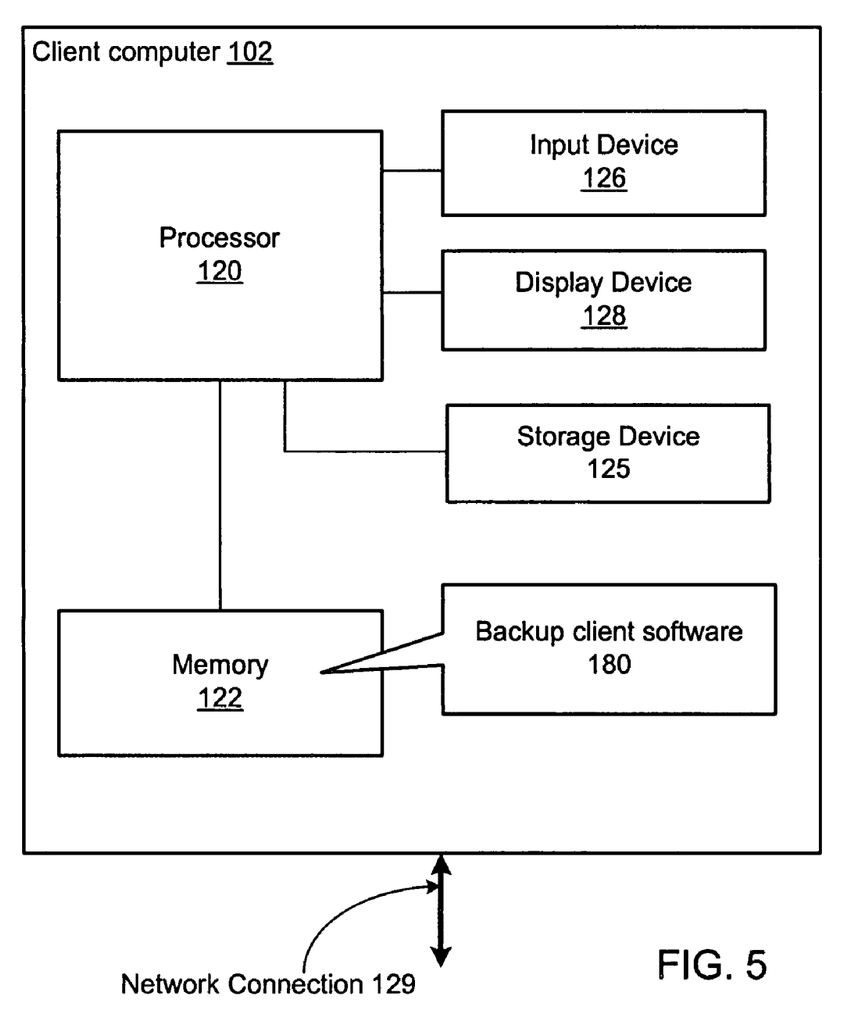
FIG. 5 illustrates an example of a client computer such as illustrated in the system of FIG. 3.

FIG. 5 illustrates an example of a respective client computer 102 according to one embodiment. The client computer 102 includes a processor 120 coupled to a memory 122, similarly as described above with reference to FIG. 4. The memory 122 may store backup client software 180, which may be executed by the processor 120. The client computer 102 may also include one or more input devices 126 for receiving user input from a user of the client computer 102, as well as one or more output devices 128 for displaying output to the user. The client computer 102 may also include or be coupled to one or more storage devices 125 on which files are stored.

In backing up a file from the storage device(s) 125 of the client computer 102 to the backup server computer 100, the backup client software 180 executing on the client computer 102 may communicate with the backup management software 190 executing on the backup server computer 100. For example, in some embodiments the backup management software 190 on the backup server computer 100 may receive a file to be backed up by communicating with the backup client software 180 on the client computers 102. The backup management software 190 may also receive first authentication information for protecting the backup copy of the file from the backup client software 180. In some embodiments the backup management software 190 may also receive a subsequent request to restore the backup copy of the file from the backup client software 180, as well as the second authentication information used to authorize access to the backup copy of the file.

In other embodiments the request to restore the backup copy of the file may be received from a source other than the backup client software 180 on the client computer 102 from which the file was backed up. For example, in some embodiments the backup management software 190 may be operable to display an administration graphical user interface (GUI) on the output device 128 of the backup server computer 100. The GUI may enable an administrator of the computing environment to perform various tasks related to file backup operations. For example, the administrator may interact with the GUI to request to restore a file that was previously backed up from one of the client computers 102.

In response to the request, the backup management software 190 may prompt the administrator for the password or other authentication information associated with the file. Thus for example, if the password was initially specified by a user of the client computer 102 then the user may need to inform the administrator of the password or may need to be present when the administrator initiates the restore operation in order to provide the required password or other authentication information to the backup management software 190. In other embodiments the backup management software 190 may be operable to communicate with the backup client software 180 on the client computer 102 to allow the user to provide the required authentication information remotely without informing the administrator of the password and without being present with the administrator. For example, in one embodiment the administrator may initiate the restore operation from the backup server computer 100, and the backup management software 190 may communicate with the backup client software 180 on the client computer 102 to cause the backup client software 180 to display a graphical user interface informing the user that the administrator is attempting to restore the file and prompting the user for the required authentication information on the administrator's behalf.

In other embodiments the request to restore the backup copy of the file may be received from software executing on a computer system other than the client computer 102 from which the file was originally backed up and other than the backup server computer 100. For example, in some embodiments the backup server computer 100 may implement a web interface which enables users to communicate with the backup management software 190 on the backup server computer 100 to initiate a restore operation from any computer with a web browser application.

In various embodiments of the method, passwords or other authentication information may be associated with files that are backed up to the backup server computer 100 at any desired level of granularity. In some embodiments, a single password may be associated with each client computer 102 coupled to the backup server computer 100 or with each user of the system. Thus, for a given client computer 102, the same password (or other authentication information) may be used to protect all of the files for that client computer 102, or for a given user, the same password may be used to protect all of the files associated with that user.

Figure 6:
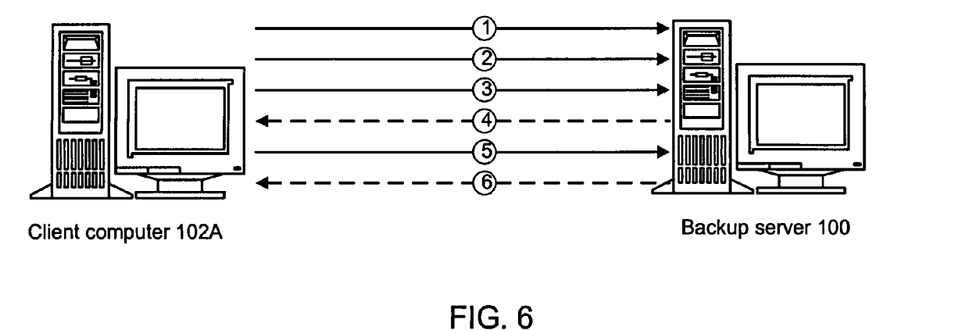
FIG. 6 illustrates an example in which a user of a client computer chooses a password at the time when backup client software is installed on the client computer, where the password is used to protect files that are backed up from the client computer in subsequent backup operations.

For example, FIG. 6 illustrates an embodiment in which a password is chosen by the user of a client computer 102A at the time the backup client software 180 is installed on the client computer 102A. For example, during the installation process, the user may be prompted to enter a password that will be used to protect all files that are backed up from the client computer 102A in subsequent backup operations.

As indicated by the arrow 1, the password specified by the user may be transmitted to the backup server computer 100 at the time the backup client software 180 is installed on the client computer 102A. As indicated by the arrow 2, one or more files may subsequently be sent from the client computer 102A to the backup server computer 100 during a backup operation. As indicated by the arrow 3, the client computer 102A may later request one or more of the files that were previously backed up to be restored. As indicated by the arrow 4, the backup server computer 100 may prompt the user of the client computer 102A to enter a password in response to the request. Thus for example, the backup client software 180 on the client computer 102 may present the user with a graphical user interface requesting the user to enter a password for accessing the backup copies of the requested files. As indicated by the arrow 5, the password specified by the user may be sent to the backup server computer 100. The backup server computer 100 may then determine whether the password received in arrow 5 matches the password that was previously specified when the backup client software 180 was installed on the client computer 102A. If so, then the backup server computer 100 may return the data for the requested files to the client computer 102A, as shown in 102A. The backup client software 180 on the client computer 102A may create a restored copy of the requested files based on the data received from the backup server computer 100.

In other embodiments the user may be able to specify different passwords or different authentication information for different files on the client computer 102A or may exclude some of the files on the client computer 102A from password protection. For example, the backup client software 180 may provide a graphical user interface enabling the user to configure different passwords for different folders, e.g., such that for a given folder, all the files located in the folder are associated with the respective password. Thus, for example, if the user subsequently attempt to restore two files that were backed up from different folders with different passwords then the user may be required to enter both of the passwords. In other embodiments the user may be able to configure passwords at other levels of granularity, e.g., on a per-file basis, per-drive basis, etc.

Figure 7:
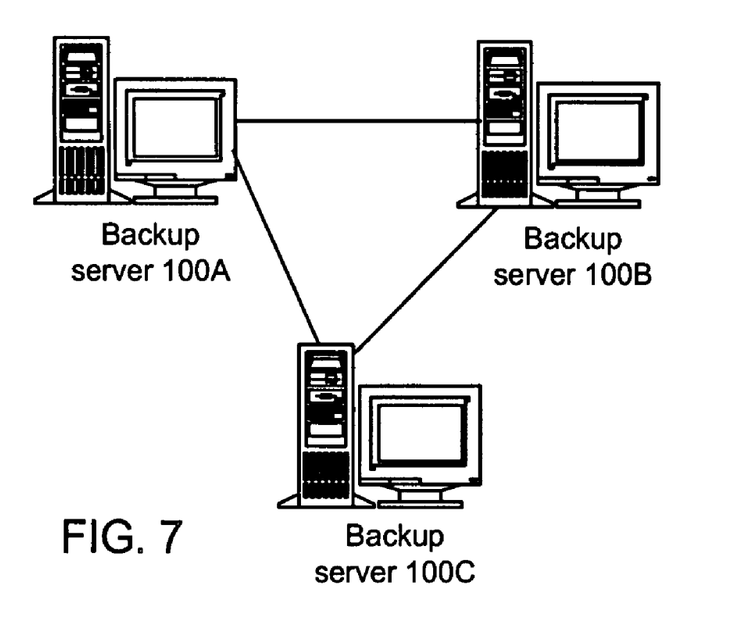
FIG. 7 illustrates another embodiment of a system in which another embodiment of the method of FIG. 1 is implemented, where the system includes a plurality of backup servers.

In some embodiments, files may be backed up from client computers 102 to multiple backup servers 100. For example, FIG. 7 illustrates an example in which there are three backup servers 100A-100C. (The client computers 102 are not shown in this illustration.) In some embodiments, when a file is backed up from a given client computer 102, multiple backup copies of the file may be stored on multiple backup servers 100. For example, three backup copies of the file may be stored on each of the servers 100A, 100B, and 100C. Each backup server 100 may store information indicating that the password or other authentication information associated with the file is required in order to restore the respective backup copy from the respective backup server 100.

In other embodiments, instead of storing a complete backup copy of the file on each backup server 100, a backup copy may be distributed across the multiple backup servers 100. For example, when a file is backed up, the file may be split into a plurality of segments, and the segments may be distributed across the backup servers 100. For example, in the system of FIG. 7, the file may be split into 12 segments, where 4 of the segments are backed up to the backup server 100A, another 4 of the segments are backed up to the backup server 100B, and the remaining 4 segments are backed up to the backup server 100C. To restore the backed up file, backup client software 180 executing on the client computer 102 (or other software executing on another computer system) may communicate with the backup management software 190 executing on one or more of the backup servers 100, e.g., supplying authentication information to gain access to the backed up file similarly as described above. After determining that the supplied authentication information matches authentication information previously associated with the backed up file, the backup management software 190 may coordinate with the other backup servers 100 to retrieve the backed up segments of the file and return the data to the client computer 102.

It is noted that various embodiments may further include receiving, sending or storing instructions and/or data implemented in accordance with the foregoing description upon a computer-readable memory medium. Generally speaking, a computer-readable memory medium may include storage media or memory media such as magnetic or optical media, e.g., disk or CD-ROM, volatile or non-volatile media such as RAM (e.g. SDRAM, DDR SDRAM, RDRAM, SRAM, etc.), ROM, etc. for storing program instructions. Such a computer-readable memory medium may store program instructions received from or sent on any transmission media or signals such as electrical, electromagnetic, or digital signals, conveyed via a communication medium such as network and/or a wireless link.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A computer-readable memory medium storing program instructions for backing up and restoring a file split into a plurality of segments, wherein the program instructions are executable to:
   create first authentication information on a client computer based on input received from a first user during an installation of backup client software on the client computer;
   store the first authentication information on one or more backup server computers of a plurality of backup server computers;
   in response to an automatic request from the backup client software on the client computer to backup said file:
      at each respective backup server computer of the plurality of backup server computers:
         receive a respective subset of the plurality of segments of the file; and
         store each segment of the respective subset for backup storage;
      at one or more backup server computers of the plurality of backup server computers, automatically store information that associates the file with the first authentication information and indicates that the first authentication information is required to restore the file;
   in response to a request from a second user to restore the file at a particular backup server computer of the plurality of backup server computers:
      access said information in order to determine whether the file has associated authentication information;
      in response to determining said stored information indicates the first authentication information is required to restore the file:
         prompt the second user to provide second authentication information;
         receive the second authentication information;
         in response to determining that the second authentication information matches the first authentication information, communicate with each of the other backup server computers of the plurality of backup server computers in order to retrieve each respective segment of the file and return the respective segment to the client computer;
         in response to determining that the second authentication information does not match the first authentication information, deny restoration of the file by the second user.

2. The computer-readable memory medium of claim 1, wherein the program instructions are executable to:
   perform backup of a plurality of files on behalf of the first user; and
   store distinct authentication information provided by the first user for each of the plurality of files, wherein restoration of a given file of the plurality of files requires a user requesting restoration of the given file provide authentication information that matches a respective stored distinct authentication information.

3. The computer-readable memory medium of claim 2, wherein the program instructions are executable to store authentication information in an encrypted form.

4. The computer-readable memory medium of claim 1, wherein the file is a first file of a plurality of files backed up to the plurality of backup server computers, wherein the program instructions are further executable to:
   store information indicating that the first authentication information is required to restore any file of the plurality of files;
   at the particular backup server computer:
      receive a second request to restore a second file of the plurality of files;
      in response to the received second request, determine said stored information indicates the first authentication information is required to restore any file of the plurality of files;
      receive third authentication information; and
      determine whether to grant or deny permission to restore the second file by determining whether the third authentication information matches the first authentication information.

5. The computer-readable memory medium of claim 1, wherein the program instructions are further executable to:
   at the particular backup server computer, display an administration graphical user interface (GUI) on a display device of the particular backup server computer;
   receive a second request to restore the file from an administrator of the particular backup server computer via the GUI;
   in response to the second request, communicate with the client computer to request a user of the client computer to provide authentication information for restoring the file;
   receive from the client computer third authentication information provided by the user; and
   determine whether to grant or deny permission to restore the file by determining whether the third authentication information matches the first authentication information.

6. The computer-readable memory medium of claim 1, wherein the program instructions are further executable to:
   at the particular backup server computer, display an administration graphical user interface (GUI) on a display device of the particular backup server computer;
   receive a second request to restore the file from an administrator of the particular backup server computer via the GUI;
   prompt the administrator to provide authentication information for restoring the file in response to the second request;
   receive third authentication information provided by the administrator; and
   determine whether to grant or deny permission to restore the file by determining whether the third authentication information matches the first authentication information.

7. The computer-readable memory medium of claim 1, wherein the file is a first file corresponding to a first folder of a plurality of folders backed up to the plurality of backup server computers, wherein each folder comprises a plurality of files, wherein the client computer is a first client computer, wherein the program instructions are further executable to:
   create fourth authentication information on a client computer based on input received from the first user during said installation, wherein the fourth authentication information corresponds to a second folder of the plurality of folders;
   receive a second request to restore the file through an Internet web interface from a browser application executing on a second client computer;
   receive third authentication information through the Internet web interface from the browser application executing on the second client computer; and determine whether to grant or deny permission to restore the file by determining whether the third authentication information matches the first authentication information.

8. The computer-readable memory medium of claim 1, wherein, in storing the information indicating that the first authentication information is required to restore the file, the program instructions are executable to perform one or more of:
   storing the first authentication information;
   storing information derived from the first authentication information.

9. The computer-readable memory medium of claim 1, wherein the first authentication information comprises a password.

10. The computer-readable memory medium of claim 1, wherein the first authentication information comprises biometric information.

11. The computer-readable memory medium of claim 10, wherein the biometric information comprises one or more of:
   fingerprint information;
   voice information; and/or retinal scan information.

12. A computer-implemented method for backing up and restoring a file split into a plurality of segments, the method comprising:
   creating first authentication information on a client computer based on input received from a first user during an installation of backup client software on the client computer;
   storing the first authentication information on one or more backup server computers of a plurality of backup server computers;
   in response to an automatic request from the backup client software on the client computer to backup said file:
      at each respective backup server computer of the plurality of backup server computers:
         receiving a respective subset of the plurality of segments of the file; and
         storing each segment of the respective subset for backup storage;
      at one or more backup server computers of the plurality of backup server computers, automatically storing information that associates the file with the first authentication information and indicates that the first authentication information is required to restore the file;
   in response to a request from a second user to restore the file at a particular backup server computer of the plurality of backup server computers:
      accessing said information in order to determine whether the file has associated authentication information;
      in response to determining said stored information indicates the first authentication information is required to restore the file:
         prompting the second user to provide second authentication information;
         receiving the second authentication information;
         in response to determining that the second authentication information matches the first authentication information, communicating with each of the other backup server computers of the plurality of backup server computers in order to retrieve each respective segment of the file and return the respective segment to the client computer;
         in response to determining that the second authentication information does not match the first authentication information, deny restoration of the file by the second user.

13. The computer-implemented method of claim 12, further comprising:
   performing backup of a plurality of files on behalf of the first user; and
   storing distinct authentication information provided by the first user for each of the plurality of files, wherein restoration of a given file of the plurality of files requires a user requesting restoration of the given file provide authentication information that matches a respective stored distinct authentication information.

14. The computer-implemented method of claim 13, further comprising storing authentication information in an encrypted form.

15. The computer-implemented method of claim 12, wherein the file is a first file of a plurality of files backed up to the plurality of backup server computers, wherein the method further comprises:
   storing information indicating that the first authentication information is required to restore any file of the plurality of files;
   at the particular backup server computer:
      receiving a request to restore a second file of the plurality of files;
      in response to the received second request, determine said stored information indicates the first authentication information is required to restore any file of the plurality of files;
      receiving third authentication information; and
      determining whether to grant or deny permission to restore the second file by determining whether the third authentication information matches the first authentication information.

16. The computer-implemented method of claim 12, further comprising:
   displaying an administration graphical user interface (GUI) on a display device of the particular backup server computer;
   receiving a second request to restore the file from an administrator of the particular backup server computer via the GUI;
   in response to the second request, communicating with the client computer to request a user of the client computer to provide authentication information for restoring the file;
   receiving from the client computer third authentication information provided by the user; and
   determining whether to grant or deny permission to restore the file by determining whether the third authentication information matches the first authentication information.

17. The computer-implemented method of claim 12, further comprising:
   displaying an administration graphical user interface (GUI) on a display device of the particular backup server computer;
   receiving a second request to restore the file from an administrator of the particular backup server computer via the GUI;
   prompting the administrator to provide authentication information for restoring the file in response to the second request;
   receiving third authentication information provided by the administrator; and determining whether to grant or deny permission to restore the file by determining whether the third authentication information matches the first authentication information.

18. The computer-implemented method of claim 12, wherein said storing the information indicating that the first authentication information is required to restore the file comprises one or more of:
storing the first authentication information;
storing information derived from the first authentication information.

19. A system for backing up and restoring a file split into a plurality of segments, the system comprising:
a plurality of backup server computers, wherein each backup server computer includes one or more processors and memory storing program instructions;
a client computer system coupled to the plurality of backup server computers configured to:
create first authentication information on the client computer based on input received from a first user during an installation of backup client software on the client computer; and
store the first authentication information on one or more backup server computers of a plurality of backup server computers;
wherein in response to an automatic request from the backup client software on the client computer to backup said file:
each respective backup server computer of the plurality of backup server computers is configured to receive a respective subset of the plurality of segments of the file and store each segment of the respective subset for backup storage;
one or more backup server computers of the plurality of backup server computers are configured to automatically store information that associates the file with the first authentication information and indicates that the first authentication information is required to restore the file;
wherein in response to a request from a second user of to restore the file at a particular backup server computer of the plurality of backup server computers, the particular backup server is configured to:
access said information in order to determine whether the file has associated authentication information;
in response to determining said stored information indicates the first authentication information is required to restore the file:
prompt the second user to provide second authentication information;
receive second authentication information;
in response to determining that the second authentication information matches the first authentication information, communicate with each of the other backup server computers of the plurality of backup server computers in order to retrieve each respective segment of the file and return the respective segment to the client computer;
in response to determining that the second authentication information does not match the first authentication information, deny restoration of the file by the second user.

* * * * *